Figure 1:
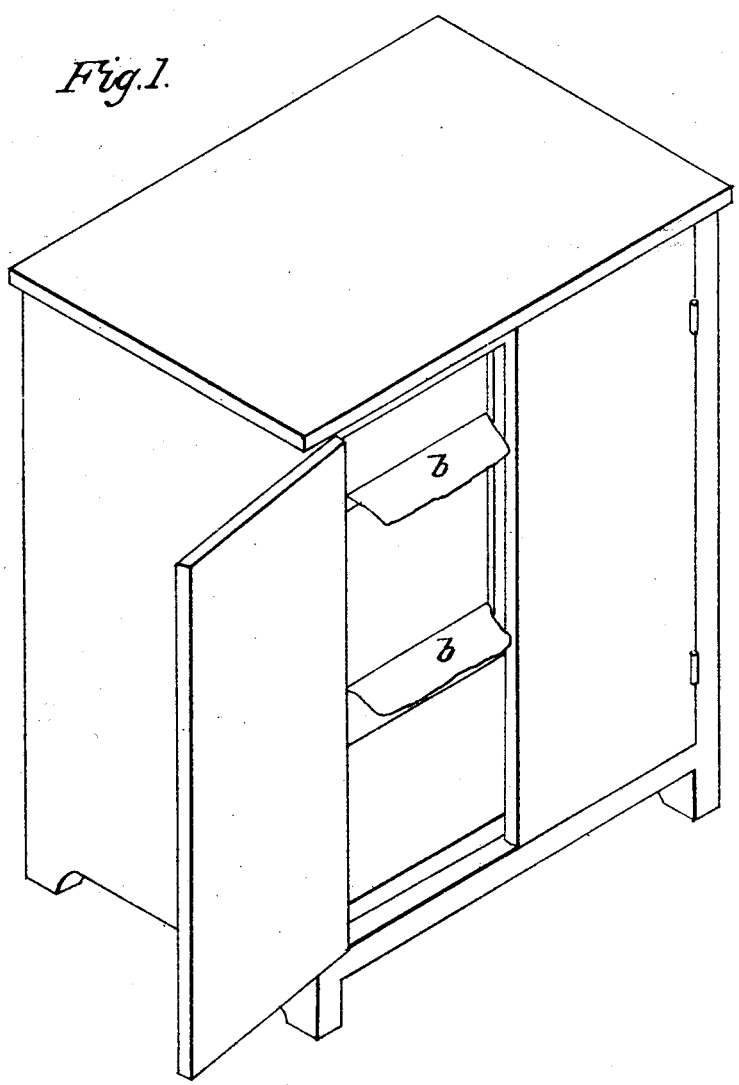

H. W. SABINE.
Bee Hive.

No. 4,355.

2 Sheets—Sheet 1.

Patented Jan'y 15, 1846.

H. W. SABINE.
Bee Hive.
2 Sheets—Sheet 2.
No. 4,355.
Patented Jan'y 15, 1846.
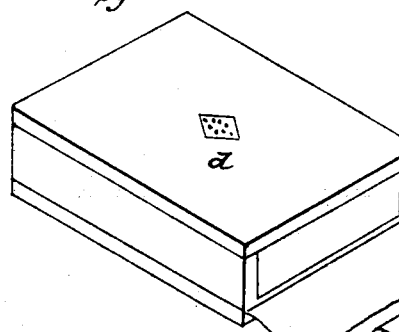
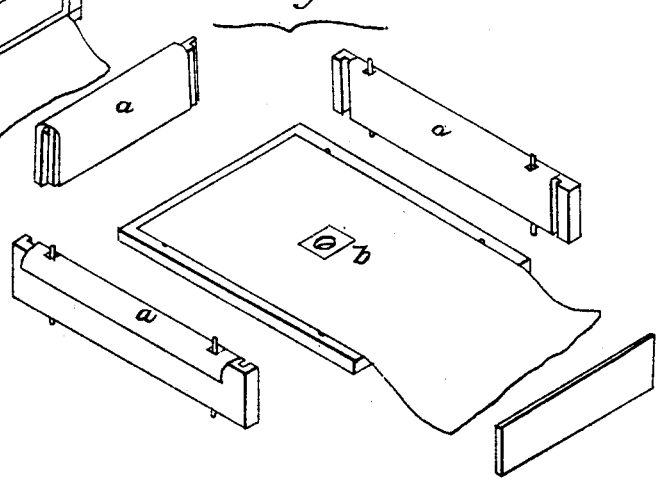
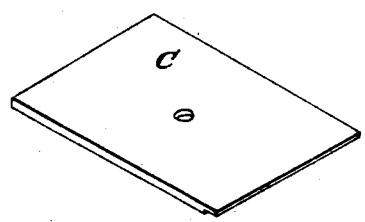
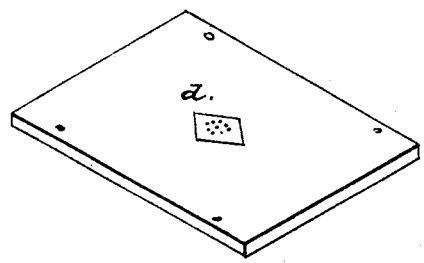

UNITED STATES PATENT OFFICE.

HARVEY W. SABIN, OF GORHAM, NEW YORK.

BEEHIVE.

Specification of Letters Patent No. 4,355, dated January 15, 1846.

*To all whom it may concern:*

Be it known that I, HARVEY W. SABIN, of Gorham, in the county of Ontario and State of New York, have invented a new and useful Improvement in Beehives; and I do hereby declare that the following is a full, clear, and exact description thereof, reference being had to the accompanying drawing, in which—

Figure 1, represents a common bureau hive with my improvements affixed. Fig. 2, one of my improved honey boxes set up. Fig. 3, parts of the honey box detached.

The nature of my invention consists in forming the honey boxes so that all the sides can be readily detached (they go together with dowel pins or other suitable contrivance) so that said boxes can be lined with paper around the sides and bottom that is easily removed with the honey the top of the box has a thin board under it on which the comb is formed.

The hive can be made of any of the known patterns but I prefer the well known one called the bureau hive which is represented in my drawings; the honey boxes are of the common form as shown at Fig. 2, but so constructed as to be taken to pieces as may be more clearly seen in Fig. 3, each side being separate; on the side and back a paper (*a*) is put, these pieces turn over the edges, and the dowel pins that hold the box together confine it and also the bottom covering (*b*) when the sides and bottom are put together a thin board (*c*) is placed in, that comes flush with the top of the sides; over this the true top (*d*) fits and the whole is ready for use as shown in Fig. 2, and when this box is filled the honey can all be removed from the box on the board (*c*) surrounded by the paper and leaving said box perfectly clean and ready for use without breaking the comb; thus saving the expense of making new additional boxes or cleaning the old ones, and obtaining the honey in the most perfect and expeditious way.

Having thus fully described my improvement, what I claim therein as new and desire to secure by Letters Patent is—

Constructing the honey boxes so as to be taken to pieces in combination with covering them in the manner described with paper for the purposes set forth having an additional or false top on which the comb is to be built.

HARVEY W. SABIN.

Witnesses:
WM. H. BISHOP,
J. J. GREENOUGH.